US009399386B1

(12) United States Patent
Sviberg

(10) Patent No.: US 9,399,386 B1
(45) Date of Patent: Jul. 26, 2016

(54) TAILGATE HAVING A REAR WINDOW

(71) Applicant: Webasto-Edscha Cabrio GmbH, Stockdorf (DE)

(72) Inventor: Magnus Sviberg, Deggendorf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/620,813

(22) Filed: Feb. 12, 2015

(51) Int. Cl.
  *B62D 25/06* (2006.01)
  *B60J 1/18* (2006.01)
  *B60J 5/10* (2006.01)

(52) U.S. Cl.
  CPC ............ *B60J 1/1869* (2013.01); *B60J 5/101* (2013.01); *B62D 25/06* (2013.01)

(58) Field of Classification Search
  CPC ........... B60J 7/02; B60J 7/1265; B60J 7/028; B60J 7/061; B60J 77/11; B60J 7/1291; B60J 7/1855; B60J 7/20; B60J 7/203; B60J 7/04; B60J 7/047; B60J 7/12; B60R 21/13
  USPC .......... 296/107.09, 118, 210, 216, 218, 146.2
  See application file for complete search history.

(56) References Cited

U.S. PATENT DOCUMENTS

| 3,211,492 | A * | 10/1965 | Wozena | B60J 1/1869 160/23.1 |
| 7,140,657 | B2 * | 11/2006 | Cuma | B60R 5/042 296/26.09 |
| 7,651,148 | B2 * | 1/2010 | Hustyi | B60J 1/1846 296/26.01 |
| 7,914,066 | B2 * | 3/2011 | Miyake | B60J 5/107 296/146.6 |
| 8,226,151 | B2 * | 7/2012 | Miyake | B60J 5/101 296/106 |
| 2009/0265993 | A1 * | 10/2009 | Shah | B60J 5/0416 49/352 |
| 2010/0223852 | A1 * | 9/2010 | Arimoto | E05F 11/385 49/352 |
| 2012/0032474 | A1 * | 2/2012 | Kitayama | B60J 1/1869 296/180.1 |
| 2012/0169091 | A1 * | 7/2012 | Renaudin | B60J 7/0435 296/216.03 |

\* cited by examiner

*Primary Examiner* — Glenn Dayoan
*Assistant Examiner* — Sunsurraye Westbrook
(74) *Attorney, Agent, or Firm* — Quarles & Brady LLP

(57) ABSTRACT

A motor vehicle is proposed, comprising a vehicle roof, which extends between a front roof edge and a rear roof edge, wherein a tailgate is articulated thereto in the region of the rear roof edge. The tailgate limits a vehicle interior in the rear and is pivotable about an axis that extends in the transverse direction of the roof. A displaceable rear window covers a window cut-out of the tailgate in a closed position and which at least partially clears the window cut-out in an open position. The rear window, when being displaced from the closed position into the open position, is shifted to a position under the vehicle roof.

6 Claims, 9 Drawing Sheets

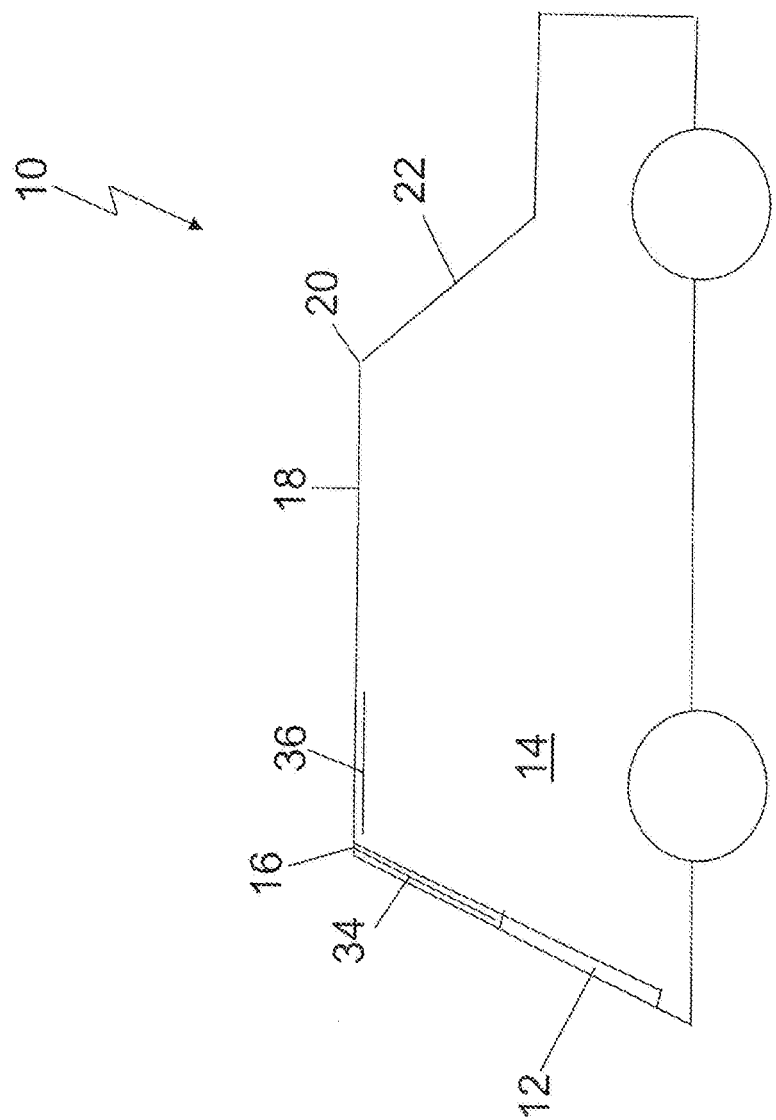

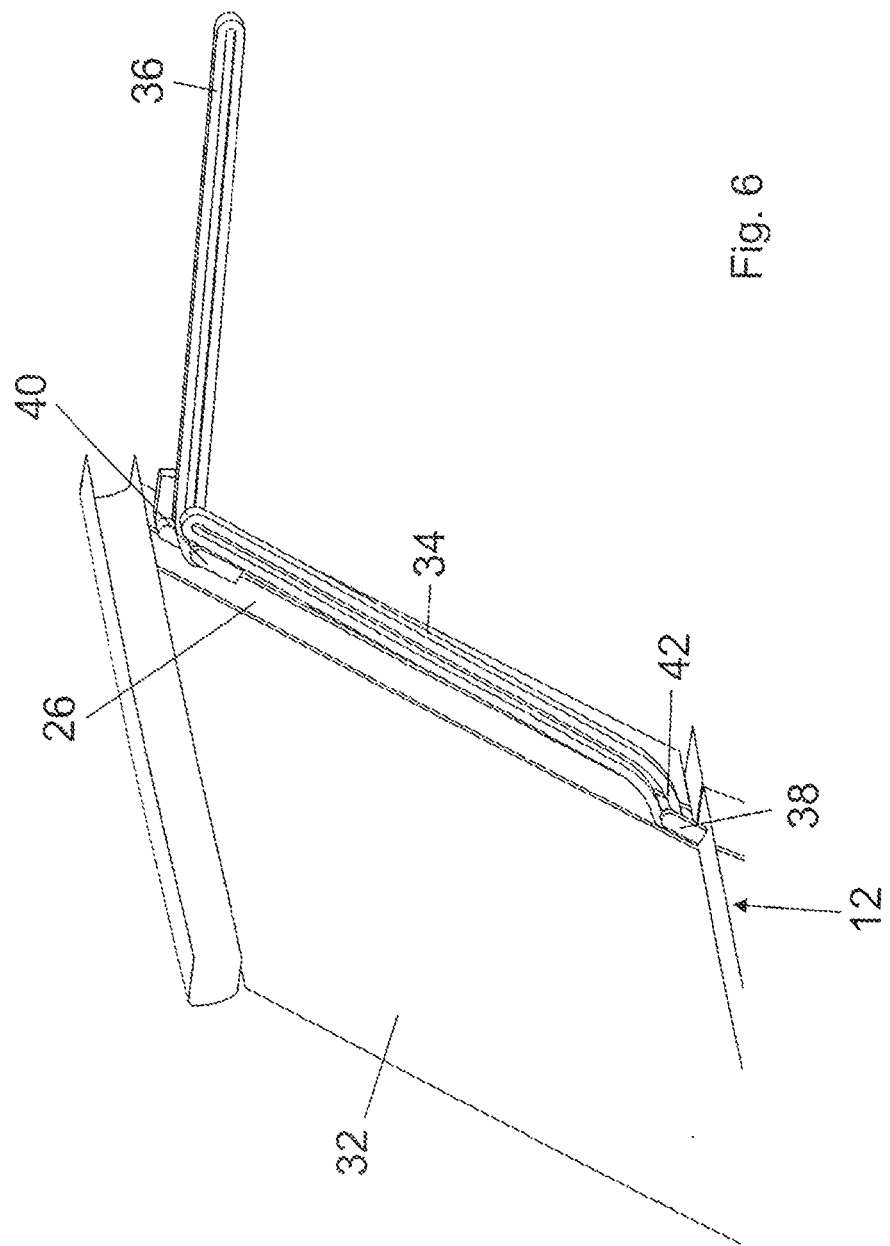

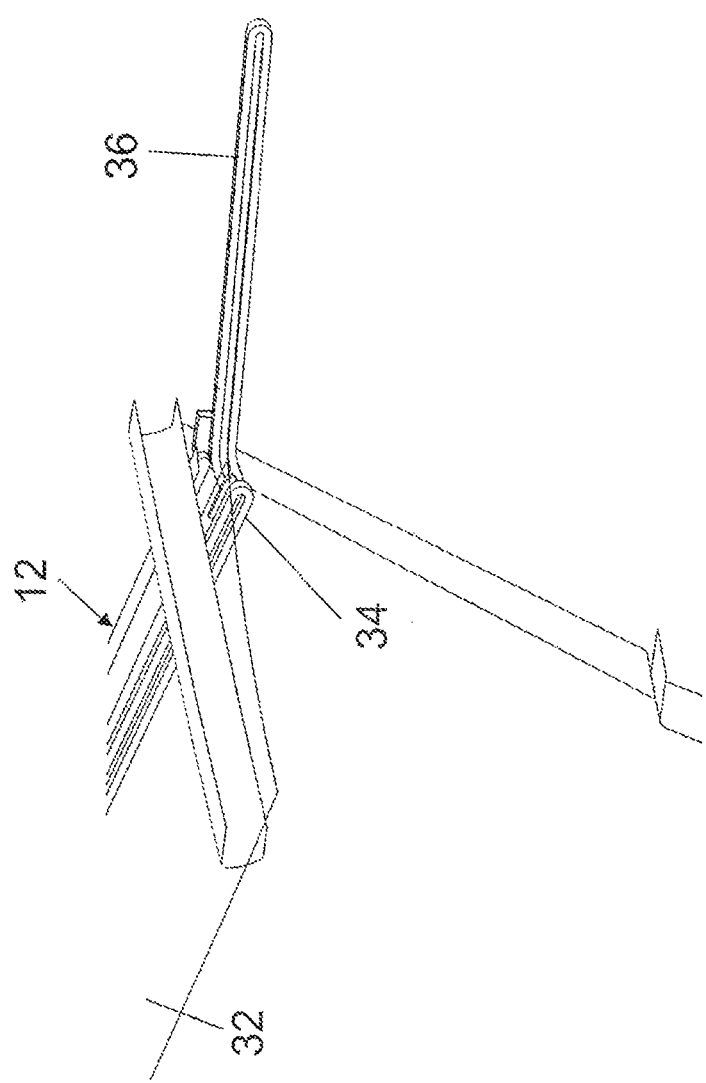

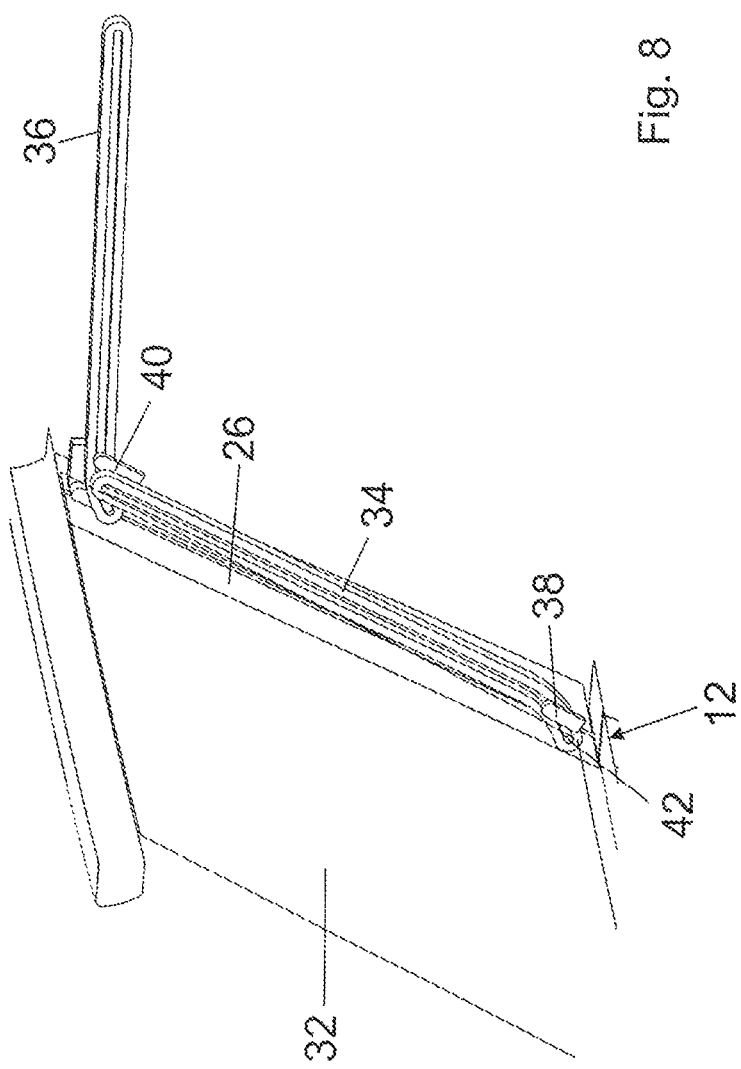

TAILGATE HAVING A REAR WINDOW

CROSS REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to a motor vehicle having a vehicle roof and a tailgate being articulated to the rear edge of the vehicle roof, said tailgate including a window cut-out, which can be closed by means of a displaceable rear window.

BACKGROUND OF THE INVENTION

A motor vehicle having a tailgate and a displaceable rear window is known from practice. In its closed position, the tailgate usually limits a rear loading space of the relevant motor vehicle. Through the displaceable rear window, a window opening of the tailgate can be cleared, which opening can be used as a loading or unloading hatch.

It is for example known to lower a window pane, for clearing a window cut-out, and to accommodate said window pane between an interior cover plate and an exterior cover plate of a door construction in the lowered state. This, however, considerably curbs the creative options relating to the door.

Furthermore, it is known to tip up a rear window for clearing a tailgate window cut-out, hereunto envisaging hinges at the upper edge of the window cut-out. With this solution, it is, however, required to move the rear window into a closed position before the tailgate itself is actuated.

SUMMARY OF THE INVENTION

It is the object of the invention to create a motor vehicle having a tailgate and a displaceable rear window that does not curb the creative options relating to the tailgate and that simultaneously allows for an actuation of the tailgate even if the rear window is in its open position.

Therefore a motor vehicle is proposed, comprising a vehicle roof, which extends between a front roof edge and a rear roof edge, wherein a tailgate is articulated thereto in the region of the rear roof edge, the tailgate limiting a vehicle interior in the rear and being pivotable about an axis that extends in the transverse direction of the roof, and comprising a displaceable rear window, which covers a window cut-out of the tailgate in a closed position and which at least partially clears the window cut-out in an open position, wherein the rear window, when being displaced from the closed position into the cleared position, is shifted to a position under the vehicle roof.

Through said shifting to a position under the vehicle roof, the tailgate can be created independently of the dimensions of the rear window and of the corresponding window cut-out. Instead, the rear window is designed according to the design of the tailgate. Simultaneously, in the region of the tailgate, a ventilation and loading function owing to the displacement option of the rear window is made possible, and that even during vehicle operation. In the open position, owing to the arrangement under the vehicle roof, the loading space, which is usually limited by the tailgate in the rear, is not filled or is only filled to a marginal extent. The loading space can moreover be accessed through the window cut-out of the tailgate solely by shifting the rear window into its open position. This means that opening the tailgate itself might be omitted. In contrast to known tailgates, by the tailgate having the proposed rear window, a loading function is provided even if the respective vehicle is positioned close to a wall or to an obstacle with its rear so that the tailgate itself cannot be opened.

In a special embodiment of the motor vehicle according to the invention, the rear window, in relation to a vertical longitudinal center plane of the vehicle, is guided on both sides in a guide rail being fixed relative to the tailgate via one lower slider, respectively, and in a guide rail being fixed relative to the roof via one upper slider, respectively. Through this design, it is possible to actuate the tailgate even if the rear window is in its open position or if the rear window is in a partially open position. This means that a loading space being limited by the tailgate can be loaded or unloaded via the loading opening that corresponds to the tailgate, independently of the position of the rear window. Hereunto, the rear window does not have to be moved into its closed position.

In order to be able to push the rear window, in its closed position, tightly against a sealing arrangement being designed at the tailgate and in order to be able to realize an open window position being equivalent to a ventilation position, in which there is a gap between the rear window and the sealing arrangement, the guide rails being fixed relative to the tailgate, in a special embodiment, in each instance have a lower end portion, which points in the direction of an outer side of the tailgate. Consequently, the rear window, when it is advanced into its closed position, is finally offset in the rear direction, such that it is pressed against the sealing arrangement. Alternatively, it is, as a matter of course, also conceivable that the sealing arrangement is designed at the rear window itself or at a frame of the rear window, the sealing arrangement, in the closed position, being pressed against a corresponding sealing surface, which is designed at the tailgate.

For actuating the rear window i.e. for displacing the rear window between the closed position and the open position, a drive unit is preferably envisaged. Hereunto, the drive unit is in particular connected to the upper sliders or to the lower sliders. In the case of a connection to the upper sliders, the drive unit is expediently integrated into the vehicle roof. In the case of a connection to the lower sliders, the drive unit is expediently integrated into the tailgate.

For coupling the sliders to the drive unit, it is advantageous if incompressible drive cables are connected to the relevant sliders. The incompressible drive cables can in turn be driven by a common drive motor. Gradient cables, flexible gear racks or the like can be employed as drive cables. The drive cables then engage with a driving gear wheel of the drive motor.

Further advantages and advantageous configurations of the subject-matter of the invention can be taken from the description, from the drawing and from the claims.

BRIEF DESCRIPTION OF THE DRAWINGS

FIG. 1 shows a strongly schematized side view of a motor vehicle having a tailgate.

FIG. 6 shows a perspective view of a rear window displacing mechanism in the closed position of the rear window.

FIG. 7 shows the rear window displacing mechanism in an open position of the tailgate.

FIG. 8 shows the rear window displacing mechanism in a partially open position of the rear window.

DETAILED DESCRIPTION OF THE EXAMPLE EMBODIMENT

Figure 3:
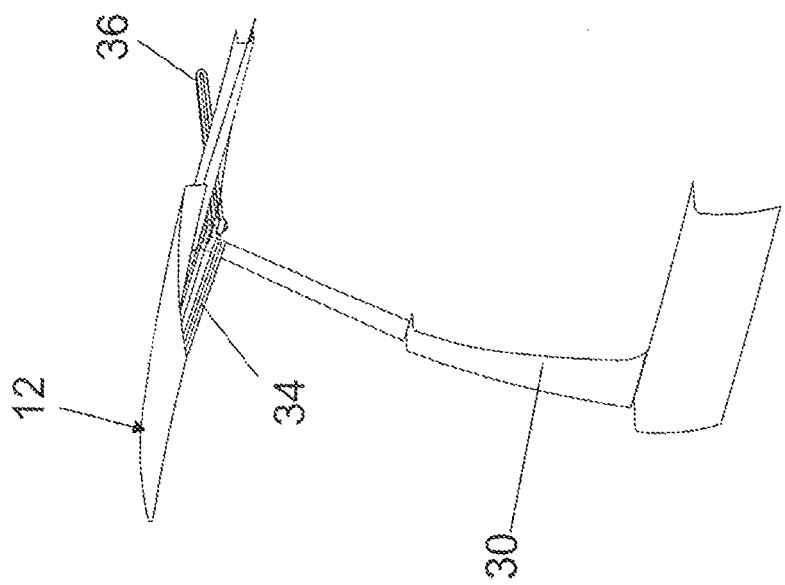
FIG. 3 shows a view that is similar to FIG. 2, but in an open position of the tailgate.

In the drawing, a motor vehicle 10 is illustrated, which is designed as a so-called station wagon and includes a tailgate 12, which, in its closed position, limits a vehicle interior or loading space 14 in the rear. The tailgate 12, at its upper edge, is articulated to a rear roof edge 16 of a vehicle roof 18, which limits the vehicle interior 14 on the top. In the front, i.e. at its front roof edge 20, the vehicle roof 18 merges into a windshield 22 via a front apron. The tailgate 12 can be pivoted between the closed position being illustrated iii FIG. 2 and the open position being illustrated in FIG. 3, in which open position a rear loading opening 30 of the motor vehicle 10 is cleared, the vehicle interior 14 being accessible via said loading opening.

The tailgate 12 is articulated to the construction of the motor vehicle 10 via hinges not being illustrated in more detail here. As it can be taken from FIGS. 2 to 10, the tailgate 12 comprises a window cut-out 24, which is limited by a frame 26. In the bottom, the window cut-out 24 is limited by a cover plate 28 for facing constructive elements and mechanism components of the tailgate 12.

Figure 5:
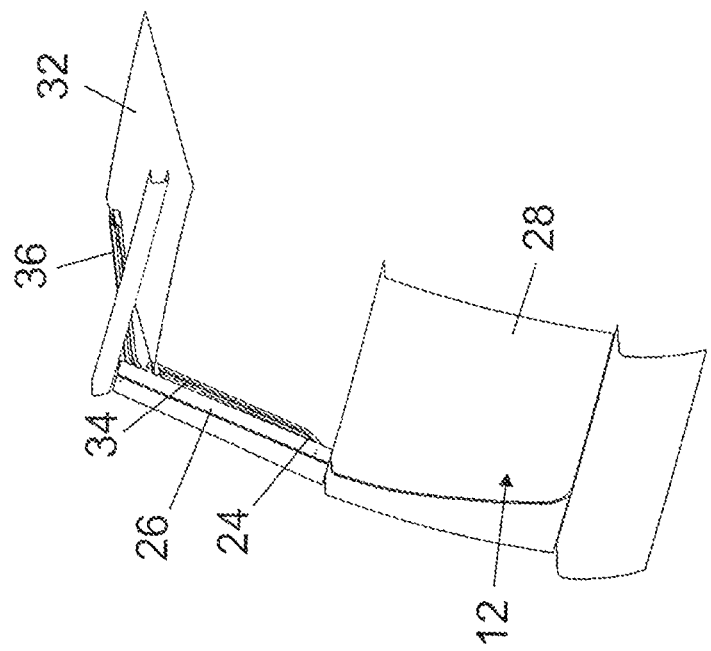
FIG. 5 also shows a view that is similar to FIG. 2, but in a completely open position of the rear window.

Furthermore, the motor vehicle 10 comprises a rear window 32, which is displaceable between a closed position, in which the window cut-out 24 of the tailgate 12 is covered, and an open position, in which the window cut-out 24 is cleared in such a manner that the vehicle interior 14, as it is illustrated in FIG. 5, can be accessed via the window cut-out 24. In the open position, the rear window 32 is shifted to a position under the vehicle roof 18. This means that, when the rear window is being displaced between the closed position and the open position, it performs a combined pivoting and translatory movement.

The construction of the tailgate 12 and of the rear window 32 including a displacing mechanism for the rear window 32, in the present description, is only illustrated on the basis of the region that is arranged on the left in relation to the forward direction of travel of the vehicle. The region that is arranged on the right in relation to the forward direction of travel is, in an equivalent fashion, designed substantially mirror-symmetrically, such that the detailed description thereof is omitted.

This means that, for displacing the rear window 32, the motor vehicle 10 comprises a displacing mechanism. Said mechanism, in relation to a vertical longitudinal center plane of the vehicle, on each of its two sides, includes a first guide rail 34, which guide rail is fixed to the frame 26 of the tailgate 12 and runs laterally next to the window cut-out 24, and a second guide rail 36, which is fixed to the vehicle roof 18 on the inner side and extends in the longitudinal direction of the vehicle.

In relation to the vertical longitudinal center plane of the vehicle, a lower slider 38 which is guided in the guide rail 34 being fixed relative to the tailgate, and an upper slider 40, which is guided in the guide rail 36 being fixed relative to the roof, is arranged at the rear window 32 on each of its two sides. The lower sliders 38 and the upper sliders 40 are in each instance mounted at the rear window 32 so as to be rotatable, such that, aside from the displacing movement of the rear window 32, an actuation of the tailgate 12 is also possible independently of the position of the rear window 32.

The guide rails 34 being fixed relative to the tailgate in each instance have a lower end portion 42, which is bent towards the rear in the direction of the outer vehicle side, i.e. in the closed position of the tailgate 12, such that the rear window 32, in its closed position, can tightly be pushed against a sealing arrangement, which is arranged at the frame 26 of the tailgate 12.

In order to displace the rear window 32, a drive motor 44 is integrated into the tailgate 12 in the region of the cover plate 28, which drive motor drives two drive cable arrangements 46A and 46B jointly, said arrangements comprising one incompressible drive cable, respectively, which is designed as a gradient cable and is connected to the respective lower slider 38 that is arranged at the rear window 32 and guided in the respective guide rail 34. This means that, upon actuation of the drive motor 44, the lower sliders 38 are driven in such a manner that they are advanced in the guide rails 34 being fixed relative to the rear window. Simultaneously, the upper sliders 40 are forcibly guided in the guide rails 36 being fixed relative to the roof.

Figure 2:
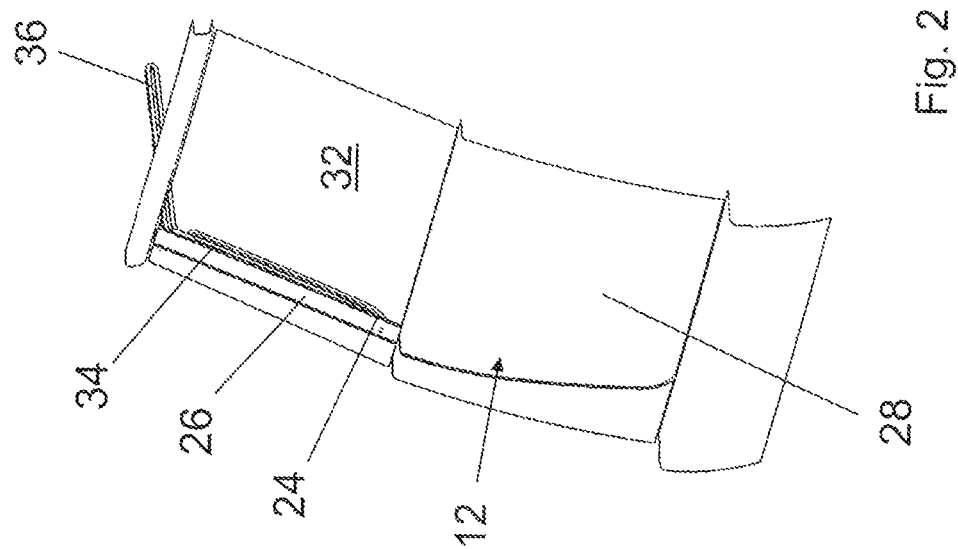
FIG. 2 shows a perspective view of a half of a rear of the motor vehicle according to FIG. 1 in a closed position of the tailgate, said half being arranged on the left in relation to a vertical longitudinal center plane of the vehicle.
Figure 4:
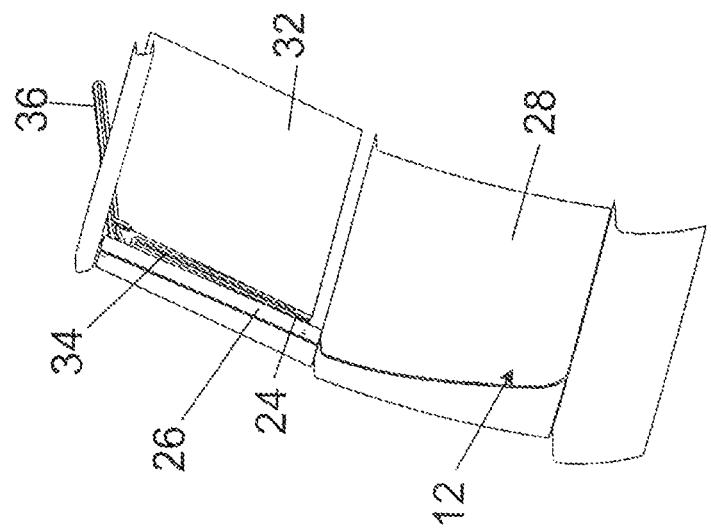
FIG. 4 also shows a view that is similar to FIG. 2, but in a partially open position of a rear window.
Figure 9:
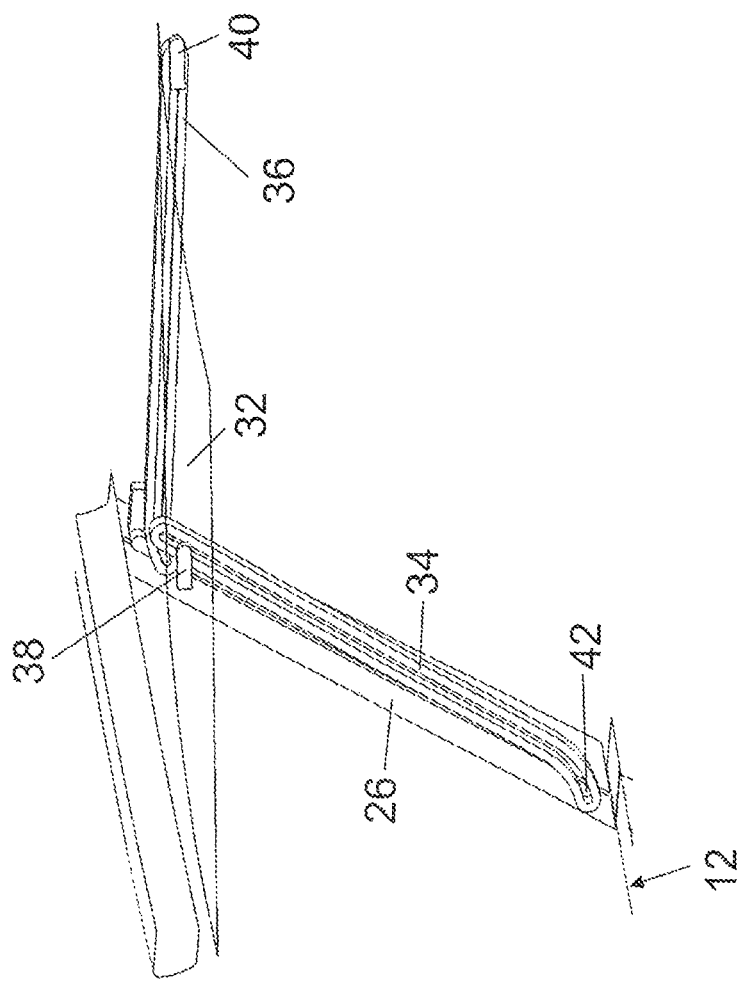
FIG. 9 shows the rear window displacing mechanism in a completely open position of the rear window.
Figure 10:
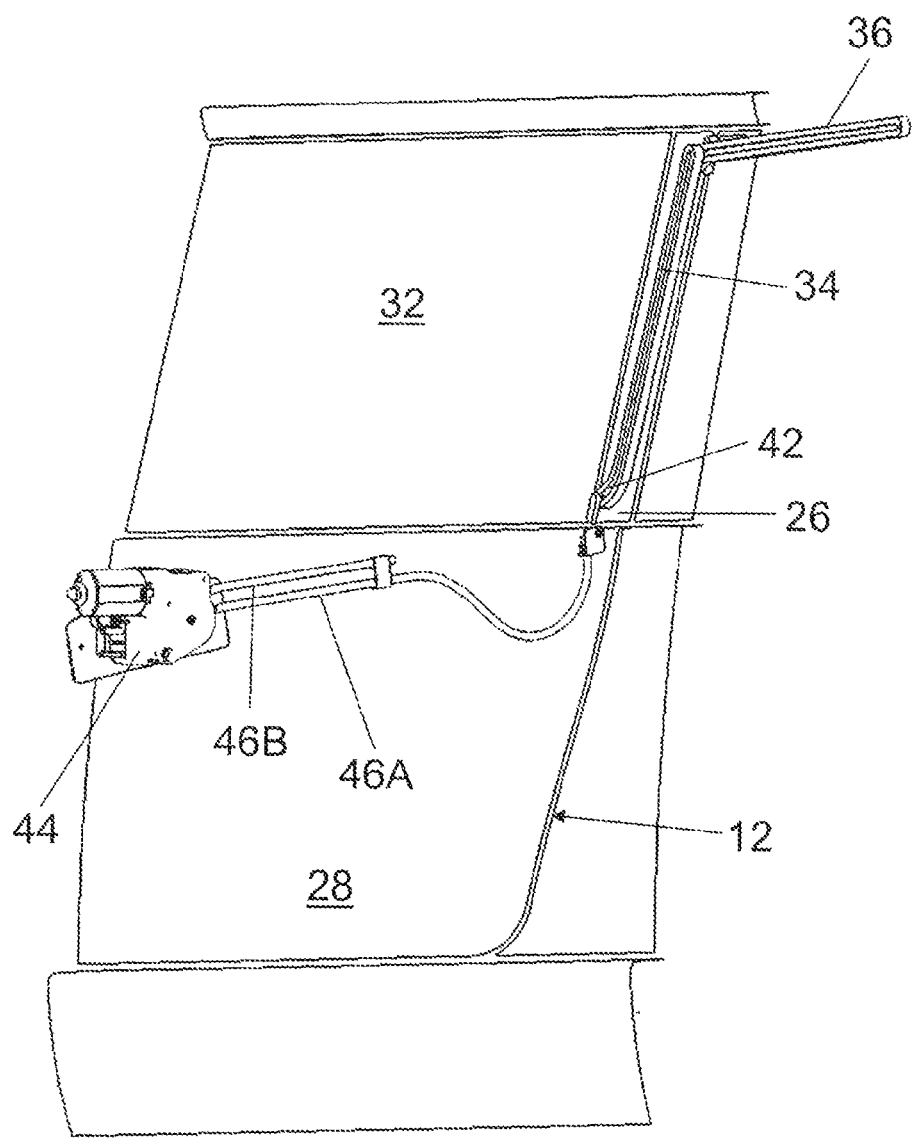
FIG. 10 shows a drive unit for the rear window, said drive unit being integrated into the tailgate.

Starting from the closed position being illustrated in FIG. 2, the rear window 32 is consequently advanced via the partially open position being illustrated in FIG. 4 into the completely open position being illustrated in FIG. 5 and FIG. 9.

By advancing the sliders 38 solely in the bent end regions 42 of the guide rails 34, the rear window 32 can be moved from the closed position into the partially open position, which constitutes a ventilation position.

In the completely open position of the rear window 32, the window cut-out 24 can also be used as a loading opening, in order to place small items into the vehicle interior without pivoting the tailgate 12 into its open position.

The tailgate 12 can be actuated independently of the position of the rear window 32. This means that it is always possible to access the vehicle interior 14, via the loading opening 30, by pivoting the tailgate 12 into the open position.

The drive motor 44 prevents, if it is not being actuated, an undesired movement of the rear window 32 as against the vehicle construction, due to the fact that the drive cables engage with a driving gear wheel of the drive motor 44. Alternatively or additionally, a closing mechanism can also be envisaged, which retains the rear window 32 in particular in the closed position.

Figure 11:
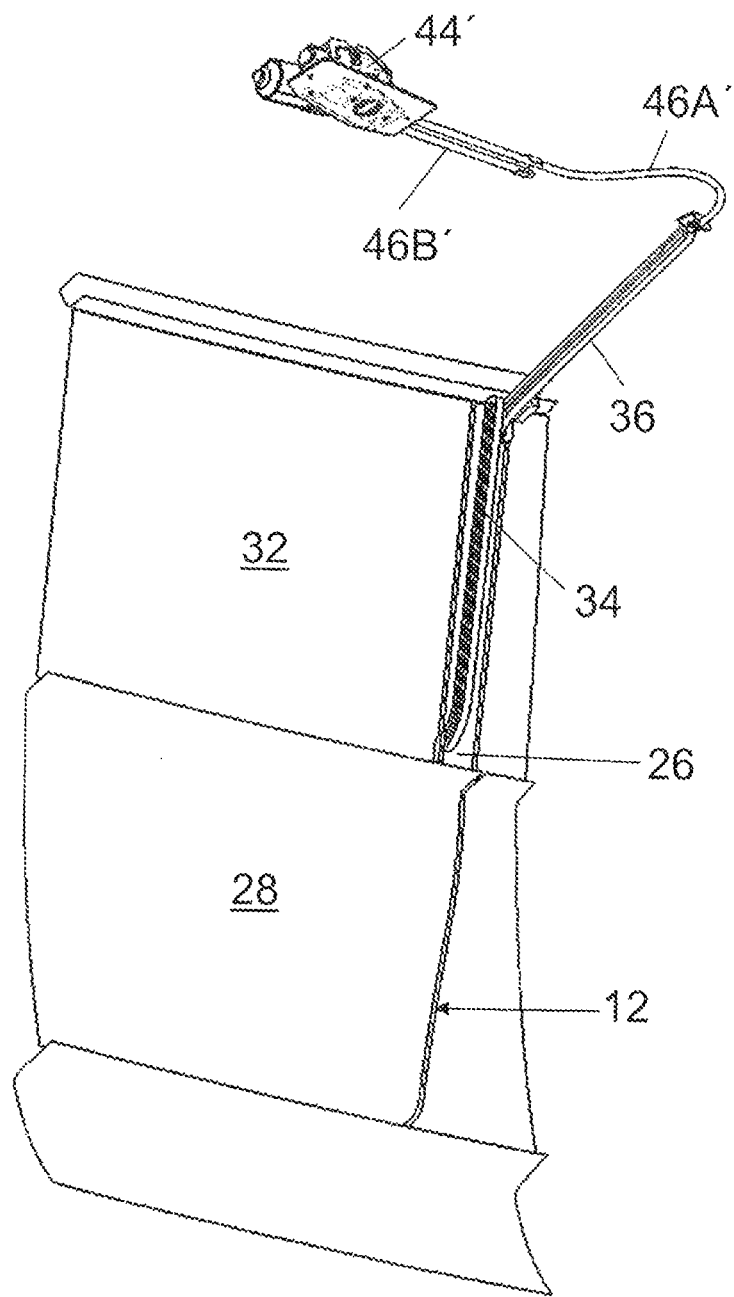
FIG. 11 shows a drive unit for the rear window, said drive unit being integrated into a vehicle roof.

In FIG. 11, an alternative embodiment of a rear window mechanism is illustrated, which is largely equivalent to the mechanism according to FIGS. 1 to 10, but which differs therefrom in that it is not the lower sliders 38 that are connected to incompressible drive cables 46A', 46B', which are driven by means of a drive motor 44', but the upper sliders 40, which can be advanced in the second guide rails 36 being fixed relative to the roof. In this case, the drive motor 44' is attached to the inner side of the vehicle roof 18. The lower sliders 38 are passive sliders, which are guided along in the first guide rails 34 when the drive motor 44 is actuated.

The invention claimed is:

1. A motor vehicle, comprising:
a vehicle roof extending between a front roof edge and a rear roof edge;
a tailgate articulated to the vehicle roof proximal the rear roof edge, the tailgate limiting a vehicle interior in the rear and being pivotable about an axis that extends in a transverse direction of the roof; and
a displaceable rear window covering a window cut-out of the tailgate in a closed position and which at least partially clears the window cut-out in an open position, wherein the rear window, when being displaced from the closed position into the open position, is shifted to a position under the vehicle roof.

2. The motor vehicle according to claim 1, wherein the rear window having opposing sides in relation to a vertical longitudinal center plane of the vehicle is guided on each side in a guide rail fixed relative to the tailgate via a lower slider and in a guide rail fixed relative to the roof via an upper slider.

3. The motor vehicle according to claim 2, wherein the guide rails-fixed relative to the tailgate in each instance have a lower end portion, which points in a direction of an outer side of the tailgate.

4. The motor vehicle according to claim 2, wherein the upper sliders are connected to a drive motor.

5. The motor vehicle according to claim 2, wherein the lower sliders are connected to a drive motor.

6. The motor vehicle according to claim 2, wherein the lower sliders or the upper sliders are in each instance connected to an incompressible drive cable, which is driven by a common drive motor.

* * * * *